United States Patent [19]
Nickerson

[11] 3,839,645
[45] Oct. 1, 1974

[54] AUTOMATIC LIQUID LEVEL CONTROL MEANS

[76] Inventor: Dennis Nickerson, 3012 St. Charles Dr., Tampa, Fla. 33618

[22] Filed: Nov. 23, 1973

[21] Appl. No.: 418,758

[52] U.S. Cl.............. 307/118, 73/304 R, 137/392, 137/12.5
[51] Int. Cl............................................ B67d 5/54
[58] Field of Search.......... 73/304 R, 290; 307/118; 137/392, 12.5

[56] References Cited
UNITED STATES PATENTS
2,284,880  1/1942  Nicholson................... 137/12.5 X
3,167,090  1/1965  Booth et al.................. 137/12.5 X
3,206,615  9/1965  Pointe........................... 73/304 R Primary Examiner—Herman Hohauser
Attorney, Agent, or Firm—Stein and Orman

[57] ABSTRACT

An automatic liquid level control means for use with automatic drink dispensing devices comprising liquid sensing probe means and control circuit means coupled between a voltage source and a liquid supply control means for automatically supplying liquid into a receptacle to a predetermined level.

10 Claims, 4 Drawing Figures

3,839,645

AUTOMATIC LIQUID LEVEL CONTROL MEANS

BACKGROUND OF THE INVENTION

1. Field of the Invention

An automatic liquid level control means for use with automatic drink dispensing devices for automatically supplying a liquid into a receptacle to a predetermined level.

2. Description of the Prior Art

In liquid dispensing machines it is desirable to accurately dispense a measured amount of liquid. Further it is desirable to automatically dispense such liquids for quick efficient serving.

Many existing liquid dispensing machines require continuous depression of an electro-mechanical control means by an attendant to dispense liquid. Not only does this operation require continuous attendance during the filling process, this manual filling operation is subject to spillage or a short fill by the operator. In addition, some liquid dispensing machines include "on/-off" switches for controlling the liquid flow. Even these machines require attendants to control the amount of liquid dispensed.

A number of liquid dispensing machines include set or fixed time constant dispensing cycle. Although this type of machine is operated with limited operator attendance, the fixed time constant dispensing cycle does not permit use of a given machine with different quantities of liquid.

A few liquid dispensing machines include means to directly sense the liquid level to control the quantity of liquid dispensed. Unfortunately, these machines are relatively expensive and electro-mechanically complex. Such complexity has, of course, its attendant reduced reliability and increased maintenance costs.

Thus, there is a need for an inexpensive, reliable automatic liquid dispensing machine.

SUMMARY OF THE INVENTION

This invention relates to an automatic liquid level control means for use with a dispensing machine. More specifically, the automatic liquid level control means comprises a liquid sensing probe means and control circuit means.

The control circuit means is coupled between a voltage source and a liquid supply control means to control the operation of the liquid supply control means. The control circuit means comprises a switch means to selectively couple the voltage source to the liquid supply control means and a holding circuit to keep the switch means closed until decoupled by the liquid sensing probe means as more fully described hereinafter.

The liquid sensing probe means comprises an elongated conductive probe electrically coupled between the switch means and holding circuit of the control circuit means. The elongated conductive probe comprises an upper fixed element and a lower element movably attached thereto.

To operate, a liquid receptacle is placed below the lower element. Since the lower element is movably attached to the upper element, the lower element is free to swing as the receptacle is placed beneath the nozzle of the dispensing machine. With the receptacle beneath the nozzle, the switch means is closed completing the circuit between the liquid supply control means and the voltage source to activate the liquid supply control means. The holding circuit will hold the switch means closed until deactivated by the liquid sensing probe means. As the receptacle is filled to a predetermined level the liquid therein will contact the lower element decoupling the holding circuit from the switch means interrupting the voltage source from the liquid supply control means deactivating the liquid supply control means. In this manner, the liquid supply control means is effectively controlled by the level of the liquid in the receptacle through the liquid sensing probe means.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
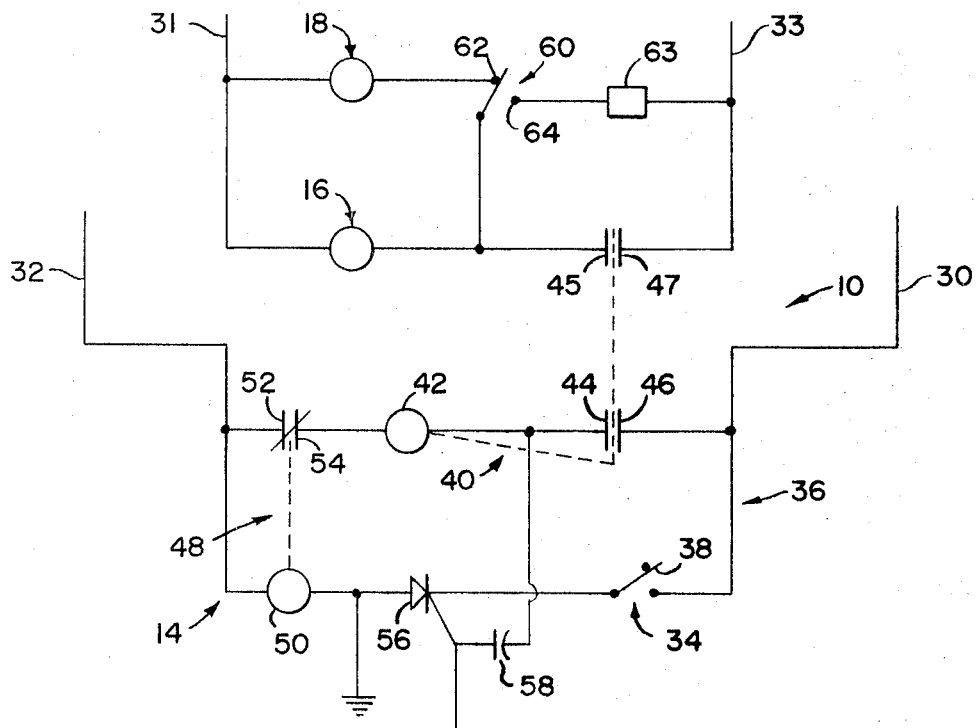
FIG. 1 shows a schematic of the liquid level control device in combination with a liquid supply control means.

As shown in FIG. 1, liquid level control means 10 comprises liquid sensing probe means 12, control circuit means 14, liquid supply control means 16 and counter means 18.

Figure 2:
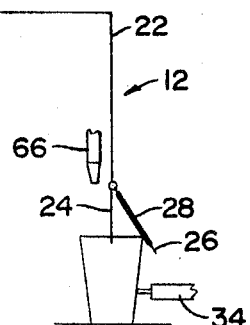
FIGS. 2 through 4 show detailed views of the liquid sensing probe means.
Figure 2:
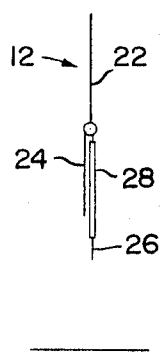
Figure 3:
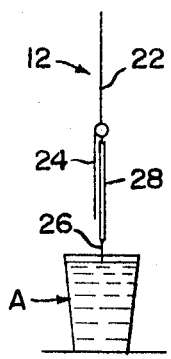
Figure 4:
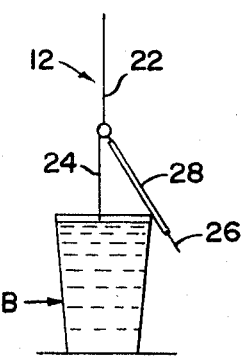

As best shown in FIGS. 2 through 4, liquid level sensing probe means 12 comprises elongated conductive probe means including upper element 22 fixedly coupled to the dispensing device and a plurality of lower elements, first and second lower elements 24 and 26 respectively movably attached to the lower end of upper element 22. As shown, second lower element is insulated on the mid portion 28 thereof.

As shown in FIG. 1, control circuit means 14 is coupled to a voltage source (not shown) between conductors 30 and 32. Control circuit means 14 comprises a first switch means generally indicated as 34 and holding circuit generally indicated as 36. First switch means 34 comprises normally open switch 38. Holding circuit 36 comprises relay means 40 including coil 42 and normally open contacts 44/46 and 45/47, and a second relay means 48 including coil 50 and normally closed contacts 52, 54, rectifier 56 and blocking capacitor 58. Second switch means includes first and second contacts 62 and 64 respectively. Counter means 18 is coupled between conductor 31 and contact 62 of second switch means. Contact 64 is coupled through time delay means 63 to conductor 33.

Liquid supply control means 16 may comprise a pump or fluid control valve such as a solenoid or the like.

To operate, a liquid receptacle A or B, FIGS. 3 and 4 respectively, is placed below lower elements 24 and 26. Since lower elements 24 and 26 are movably attached to upper element 22, each is free to swing as receptacle A, B is placed beneath nozzle 66 of the dispensing machine. As shown in FIG. 3, second lower element 26 is used with a smaller receptacle A while first lower element 24 is used with a larger receptacle B as shown in FIG. 4. Since the mid portion 28 of second lower element 26 is insulated, it does not interfere with the operation of first lower element 24.

With receptacle B beneath nozzle 66, switch means 34 is closed actuating first relay means 40 closing contacts 44/46 and contacts 45/47. With contacts 45/47 closed, liquid supply control means 16 is actuated supplying liquid into receptacle B. With second switch means in the first position, closing of contacts 45/47 will advance counter means 18 to provide a visual indication of the number of drinks dispensed. Holding circuit 36 once activated will hold contacts 44/46 and contacts 45/47 closed until deactivated by the liquid sensing probe means 12. As liquid reaches a predetermined level within receptacle B, first lower element 24 contacts the liquid activating second relay means 48 opening contacts 52, 54 deenergizing relay means 40 opening contacts 44/46 and contacts 45/47 deactivating holding circuit 36 deactuating liquid supply control means 16.

Operation of the liquid level control means 10 with receptacle A is identical as that previously described with reference to receptacle B. In this manner, liquid supply control means 16 is effectively controlled by the level of the liquid in the receptacles through the liquid sensing probe means.

Alternately, liquid supply control means 16 may be operated manually by moving second switch means to the second position to engage contact 64. Time delay means 63 automatically decouples control means 16 from the voltage source after a predetermined time delay.

Although an electro-mechanical switch means and holding circuit are shown, use of equivalent solid state devices is envisioned.

It will thus be seen that the objects set forth above, among those made apparent from the preceding description, are efficiently attained, and since certain changes may be made in carrying out tht the above method and article without departing from the scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

Now that the invention has been described, What is claimed is:

1. A liquid level control means for use in combination with a drink dispensing machine including a liquid supply control means to supply liquid into a container to a predetermined level, said liquid level control means comprises a liquid level sensing probe means and a control circuit means, said control circuit means comprises a first switch means having a first and second position and a holding circuit having an active and inactive mode, said first switch means and said holding circuit coupled to an external voltage source, said liquid level sensing probe means comprises an elongated conductive probe including an upper element fixedly coupled to said control circuit means and a first lower element movably attached to said upper element, said holding circuit being activated when said first switch means is moved from said first position to said second position, said holding circuit actuating the liquid supply control means when activated, said liquid level sensing probe means disposed to engage liquid supplied into the container at a predetermined level, said liquid level sensing probe means electrically coupled to said control circuit means to deactuate said holding circuit when said liquid level sensing probe means engages liquid in the container to deactivate the liquid supply control means.

2. The liquid level control means of claim 1 wherein said holding circuit comprises a first relay means coupled to said first switch means and a second relay means coupled to said first relay means and said liquid level sensing probe means.

3. The liquid level control means of claim 2 wherein said first switch means is normally open when in said first position and normally closed when in said second position, said first relay means includes at least one pair of normally open contacts and said second relay means includes a pair of normally closed contacts.

4. The liquid level control means of claim 3 wherein said first relay means includes a plurality of pairs of normally open contacts.

5. The liquid level control means of claim 3 wherein said holding circuit further includes a rectifier means coupled between said second relay means and said first switch means.

6. The liquid level control means of claim 1 further including a second switch means having a first and second position, said second switch means coupled between the voltage source and liquid supply control means to bypass said control circuit means when said second switch means is in said second position.

7. The liquid level control means of claim 6 further including a counter means coupled between said control circuit means and the liquid supply control means through said second switch means when said second switch means is in said first position.

8. The liquid level control means of claim 1 wherein said liquid level sensing probe means further includes a second lower element movably attached to said fixed upper element, said second lower element extending below said first lower element.

9. The liquid level control means of claim 8 wherein at least a portion of said second lower element is insulated.

10. The liquid level control means of claim 7 further including time delay means coupled to the liquid supply control means through said second switch means.

* * * * *